United States Patent
Park

(10) Patent No.: US 7,070,271 B2
(45) Date of Patent: Jul. 4, 2006

(54) EYEGLASSES ASSEMBLY INCLUDING MAIN EYEGLASSES AND AUXILIARY EYEGLASSES COMBINED WITH EACH OTHER VIA CONNECTION BAR

(75) Inventor: Hun-Yang Park, Daegu (KR)

(73) Assignee: Multi Vision, Inc., Daegu (KR)

( * ) Notice: Subject to any disclaimer, the term of this patent is extended or adjusted under 35 U.S.C. 154(b) by 0 days.

(21) Appl. No.: 10/826,383

(22) Filed: Apr. 19, 2004

(65) Prior Publication Data

US 2005/0012892 A1 Jan. 20, 2005

(30) Foreign Application Priority Data

Jul. 14, 2003 (KR) .................. 10-2003-0047990

(51) Int. Cl.
*G02C 9/00* (2006.01)

(52) U.S. Cl. .................................... 351/57; 351/47

(58) Field of Classification Search .................. 351/47, 351/57, 48, 58, 44, 41, 124
See application file for complete search history.

(56) References Cited

U.S. PATENT DOCUMENTS 6,089,708 A * 7/2000 Ku .............................. 351/47
6,352,342 B1 * 3/2002 Huang ......................... 351/47

* cited by examiner

*Primary Examiner*—Hung Xuan Dang

(57) ABSTRACT

An eyeglasses assembly including main eyeglasses and auxiliary eyeglasses which are detachably joined via a connection bar positioned therebetween. The connection bar is detachably mounted to the main eyeglasses, and is detachably and movably mounted to the auxiliary eyeglasses. The eyeglasses can provide a user with various and fashionable styles using only the main eyeglasses and the connection bar when desired, and additionally, the auxiliary eyeglasses can be combined with the main eyeglasses by using the connection bar.

13 Claims, 6 Drawing Sheets

EYEGLASSES ASSEMBLY INCLUDING MAIN EYEGLASSES AND AUXILIARY EYEGLASSES COMBINED WITH EACH OTHER VIA CONNECTION BAR

BACKGROUND OF THE INVENTION

1. Field of the Invention

The present invention relates to an eyeglasses assembly including main eyeglasses and auxiliary eyeglasses combined with each other.

2. Background of the Related Art

Many combination methods for combining main eyeglasses with auxiliary eyeglasses have been disclosed and developed to date. The inventor of the present invention has a number of patent applications and patent rights related to eyeglasses having auxiliary eyeglasses. In general, the main eyeglasses and the auxiliary eyeglasses are directly combined with each other using magnets or hooks.

However, the direct combination of the main eyeglasses with the auxiliary eyeglasses has several disadvantages. Specifically, their structure is complicated as both of the main eyeglasses and auxiliary eyeglasses must have various components for the direct combination, and they are inconvenient to use as the main eyeglasses and the auxiliary eyeglasses have the connecting components even in a state in which the combination of the main eyeglasses with the auxiliary eyeglasses is not needed.

There is therefore an urgent need for an eyeglasses assembly having main eyeglasses and auxiliary eyeglasses, which can be simply used with or without the separate components for the combination so that the user may wear only the main eyeglasses, or may wear both the main and auxiliary eyeglasses which can be easily combined with each other.

SUMMARY OF THE INVENTION

Accordingly, the present invention has been made in view of the above-mentioned problems and it is an object to provide an eyeglasses assembly in which a connection bar is interposed between main eyeglasses and auxiliary eyeglasses, so that the main eyeglasses can be selectively combined with the auxiliary eyeglasses via the connection bar.

The eyeglasses assembly can be easily assembled and disassembled and be easily opened in front according to a change of surrounding environment and the user's mood or feeling when using existing sunglasses or other eyeglasses having auxiliary eyeglasses. The connection bar is detachably mounted to the upper portions of the lens rims of the main eyeglasses in a horizontal position using various means such as magnets, pins, and so on, and then, is coupled with the auxiliary eyeglasses, so that the auxiliary eyeglasses are combined with the main eyeglasses according to the user's intended use.

According to the eyeglasses assembly, when the combination of the auxiliary eyeglasses with the main eyeglasses is desired, the main eyeglasses and the auxiliary eyeglasses are combined with each other via the connection bar. Upon removal of the auxiliary eyeglasses from the main eyeglasses, the main eyeglasses may be used alone, or may provide a beautiful outward appearance by mounting only the fashionable connection bar thereon without using the auxiliary eyeglasses.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

The structure and function of an eyeglasses assembly in which main eyeglasses are combined with auxiliary eyeglasses via a connection bar will now be described in detail.

Figure 1A:
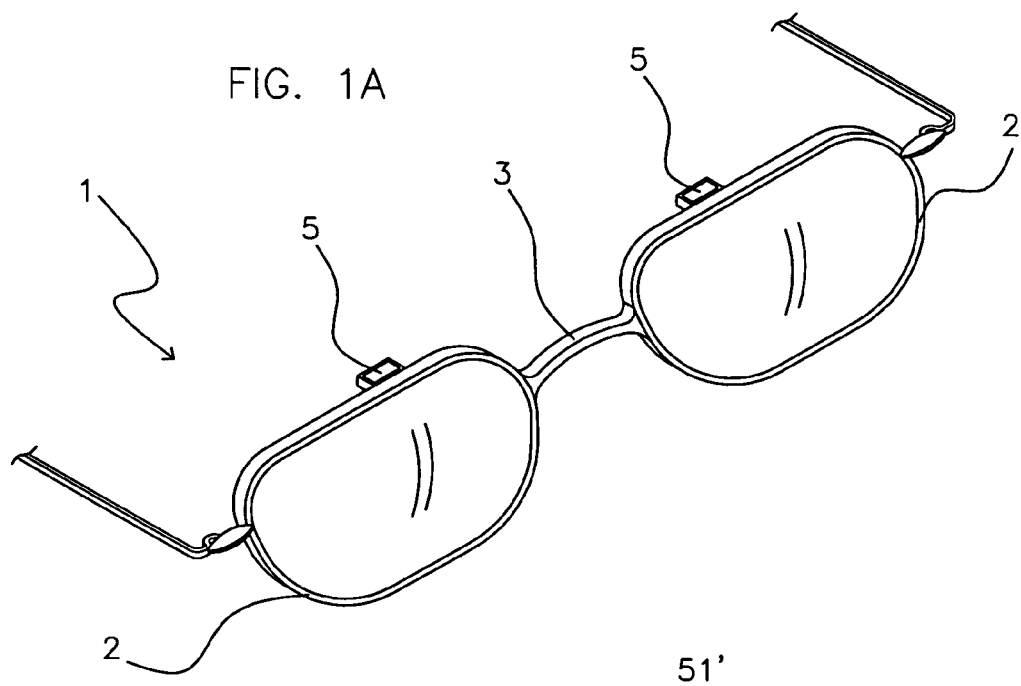
FIGS. 1A–1C are perspective views of the components of a preferred embodiment of the eyeglasses assembly according to the present invention.
Figure 1B:
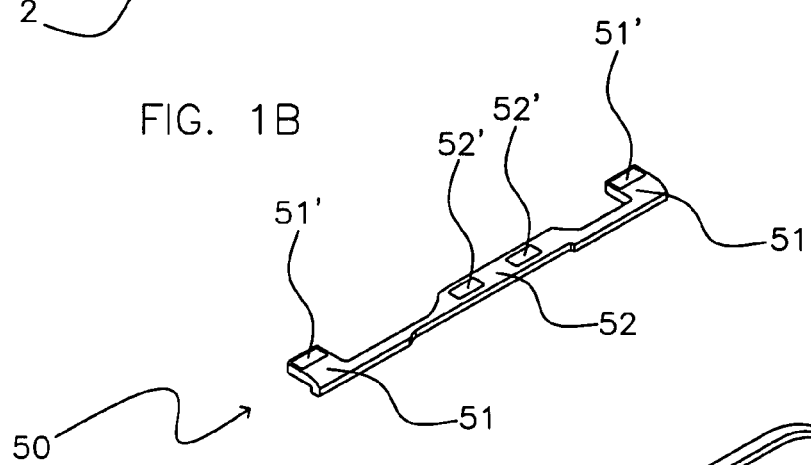
Figure 1C:
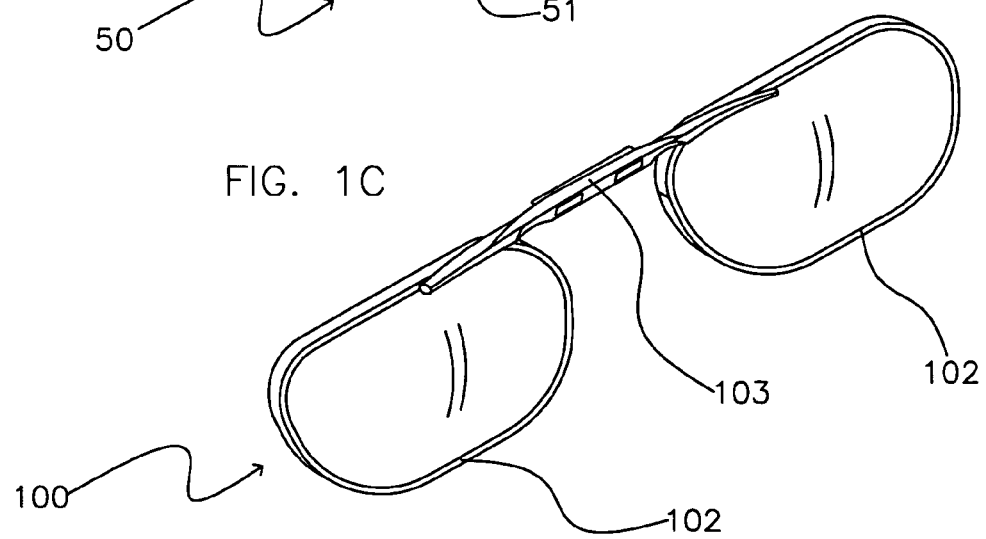

As shown in FIGS. 1A, 1B, and 1C, the present invention includes main eyeglasses 1, auxiliary eyeglasses 100, and a connection bar 50.

The main eyeglasses 1 have the shape of conventional eyeglasses including a main lens frame having a pair of lens rims 2 holding a pair of main lenses which are interconnected via a nose piece 3, also called a "bridge".

The auxiliary eyeglasses 100 include an auxiliary lens frame which has an adjacent pair of lens rims 102 holding a pair of auxiliary lenses and a nose piece 103 for interconnecting the uppermost portions of the lens rims 102. The nose piece 103 is generally called a topbar.

The lens rims 2 of the main eyeglasses 1 have connection bar seating portions 5 formed on the upper portions thereof for seating the connection bar 50 on the upper surfaces of the lens rims 2.

The connection bar 50, which may have a curved or straight construction, includes main eyeglass seating portions 51 formed at both sides thereof and an auxiliary eyeglass seating portion 52 formed at the center of the inner surface thereof. The combination of the main eyeglasses 1 with the auxiliary eyeglasses 100 can be made by any one of several known combination methods. For example, the seating portions 5, 51, 52 may have complementary pins and holes or locking jaws and hooks for joining the auxiliary eyeglasses 100 with the main eyeglasses 1. In the preferred embodiment according to the present invention, the connection bar 50 is detachably mounted on the main eyeglasses by a combination method using magnets.

As shown in FIGS. 2A through 3C, the connection bar 50 has a length corresponding to a distance between the connection bar seating portions 5 of the main eyeglasses 1, and has magnets 51' inserted into the main eyeglass seating portions 51 at positions corresponding to the connection bar seating portions 5 of the main eyeglasses 1, and magnets 52' inserted into the auxiliary eyeglass seating portion 52 at positions corresponding to the nose piece 103 which acts as the connection bar seating portion of the auxiliary eyeglasses 100. Finally, the main eyeglasses 1 and the auxiliary eyeglasses 100 are combined with each other by the attraction of the magnets 51' and 52' located to align with the corresponding positions of the connection bar seating portions 5 and nose piece 103, respectively. The joining of the main eyeglasses with the auxiliary eyeglasses by the connection bar 50 using the magnetic force of the magnets 51' and 52' can be accomplished by inserting the magnets 51' and 52' in the corresponding positions as described above. Alternatively, the whole connection bar 50 may be made of a magnetic material, and the connection bar seating portions 5 and nose piece 103 may be made of a material reacting to the magnetic material of the connection bar 50.

The auxiliary eyeglasses 100 have the lens rims 102, and the connection bar seating portion of the nose piece 103 for horizontally interconnecting the upper portions of the lens rims 102. An operative aspect of the present invention will now be described with reference to Korean Patent Application No. 10-2001-0075081 entitled "eyeglasses having auxiliary glasses, which are easily detachable and opened in front using magnets", which has been filed and published in the name of the same inventor as the present invention, and is hereby incorporated by reference in its entirety.

As set forth therein, the auxiliary eyeglasses 100 may have a '⌐' or '⌐' shaped nose piece 103, as seen from the sides, and the nose piece 103 connects the lens rims 102 with each other. The nose piece 103 of the auxiliary eyeglasses has two contacting surfaces made of a material reactive to magnetic force to correspond to and cover the auxiliary eyeglass seating portion 52 of the connection bar 50. Therefore, through assembly of the auxiliary eyeglass seating portion 52 of the connection bar 50 and the nose piece of the auxiliary eyeglasses 100 in contact with the connection bar 50, the combined eyeglasses can be kept in an opened or "lifted-up" in-use condition, or in a closed or "down" in-use state by lifting up or folding down the auxiliary eyeglasses 100 from the connection bar 50, respectively. Of course, the lens rims 102 of the auxiliary eyeglasses 100, which are horizontally connected at the upper portions thereof, may be in a single form to keep only the assembly and disassembly states.

Referring to FIGS. 2A–2C and FIGS. 3A–3C, the assembly process of the eyeglasses combination according to the present invention will be described in more detail.

Figure 2A:
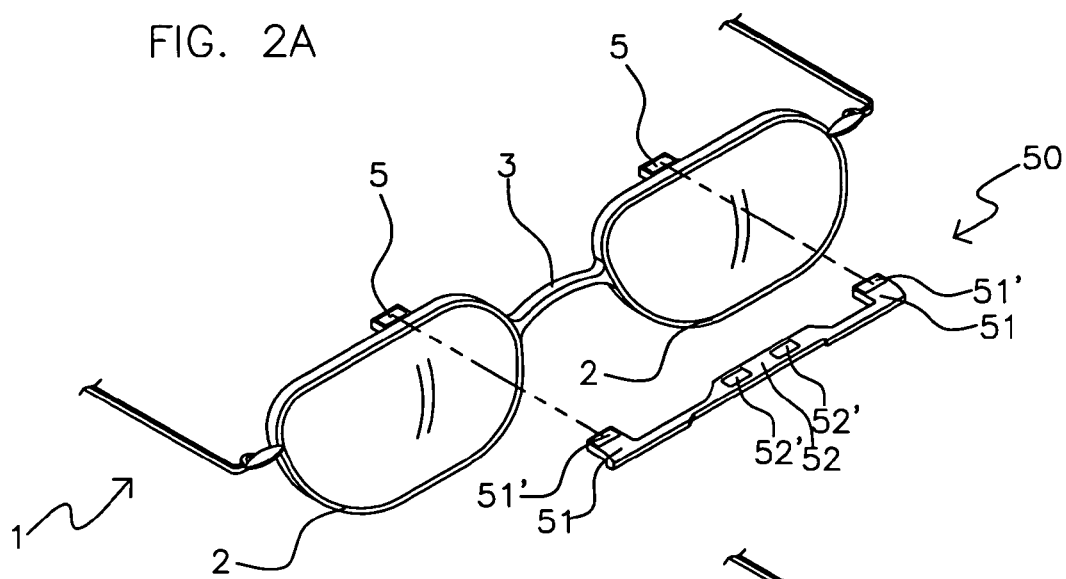
FIGS. 2A–2C are perspective views showing the assembling process of the eyeglasses assembly according to the present invention.
Figure 3A:
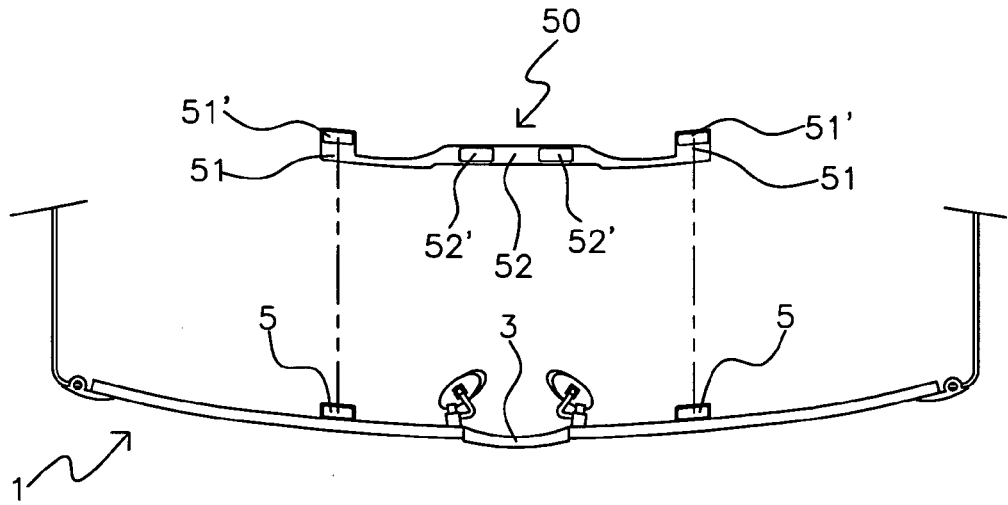
FIGS. 3A–3C are top views showing the assembling process of FIGS. 2A–2C.

First, as depicted in FIGS. 2A and 3A, the main eyeglass seating portions 51 of the magnetic connection bar 50 are correspondingly put on the connection bar seating portions 5 formed on the upper portions of the lens rims 2 of the main eyeglasses 1 so as to join them with each other by the magnetic force.

Figure 2B:
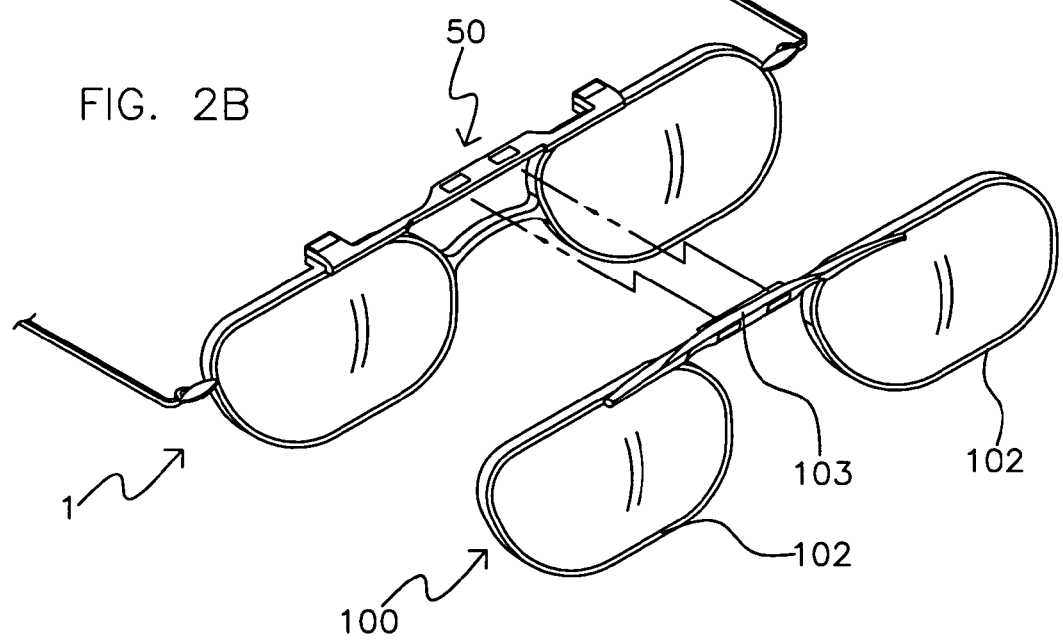
Figure 2C:
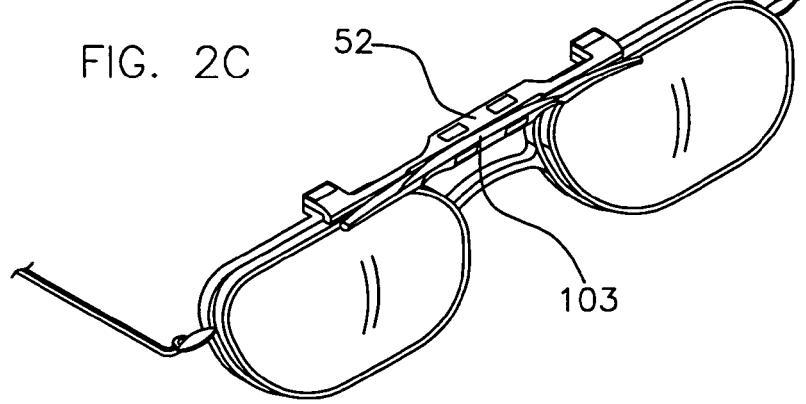
Figure 3B:
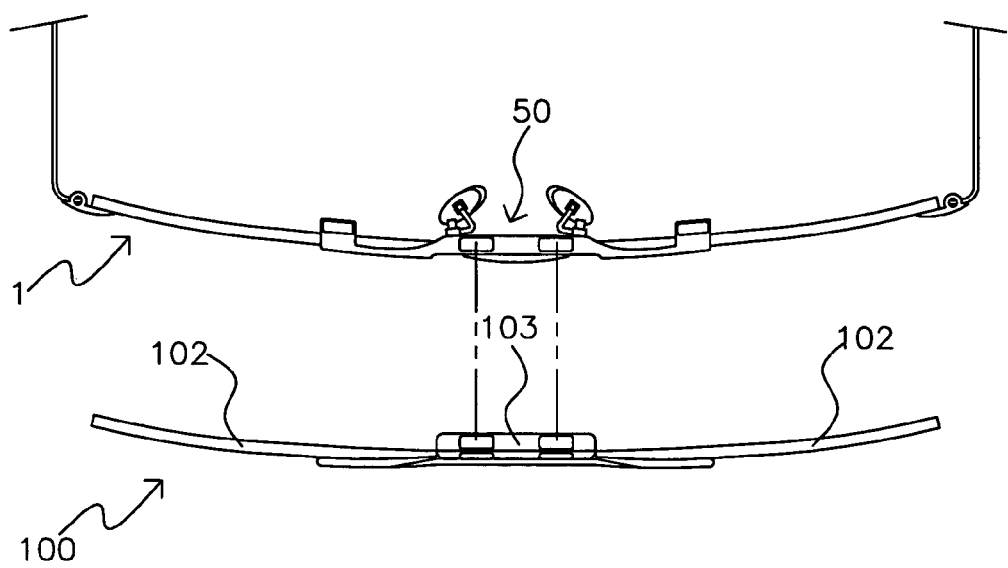
Figure 3C:
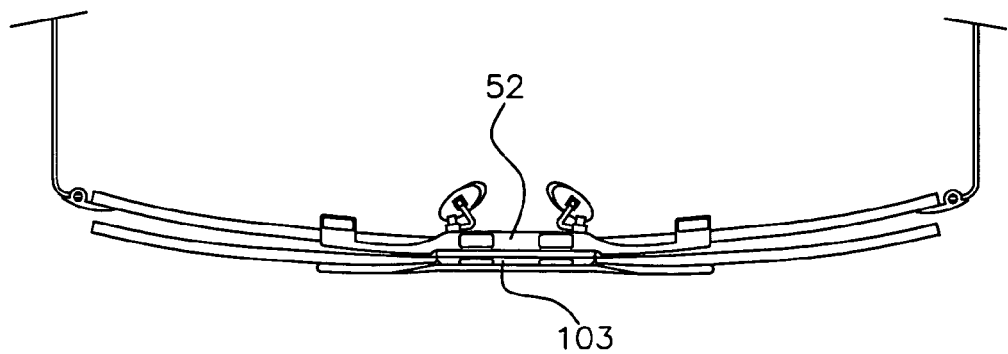

Next, as shown in FIGS. 2B and 3B, the connection bar seating portion formed at the nose piece 103 for interconnecting the upper portions of the lens rims of the auxiliary eyeglasses 100 is correspondingly joined to the auxiliary eyeglass seating portion 52 formed at the center of the connection bar 50, which horizontally connects and is fixedly attached to the upper portions of the lens rims 2 of the main eyeglasses 1. By the above steps, the auxiliary eyeglasses 100 can be combined with the main eyeglasses 1, shown fully assembled in FIGS. 2C and 3C.

Figure 4:
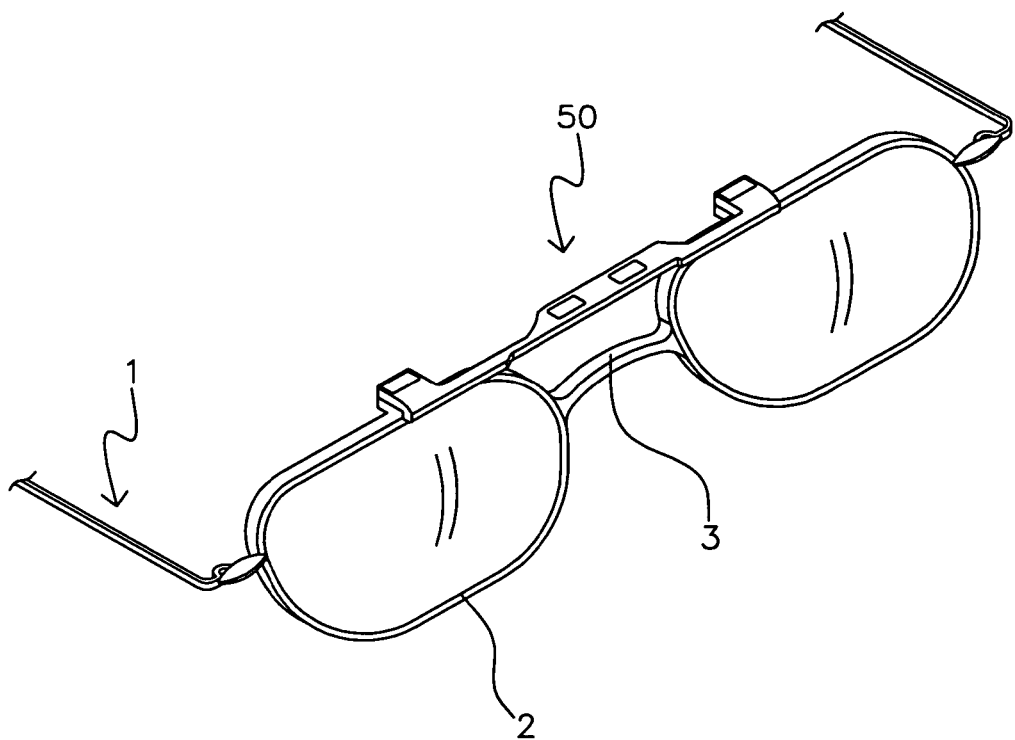
FIG. 4 is a perspective view of the main eyeglasses with connection bar mounted thereto according to the present invention.
Figure 5:
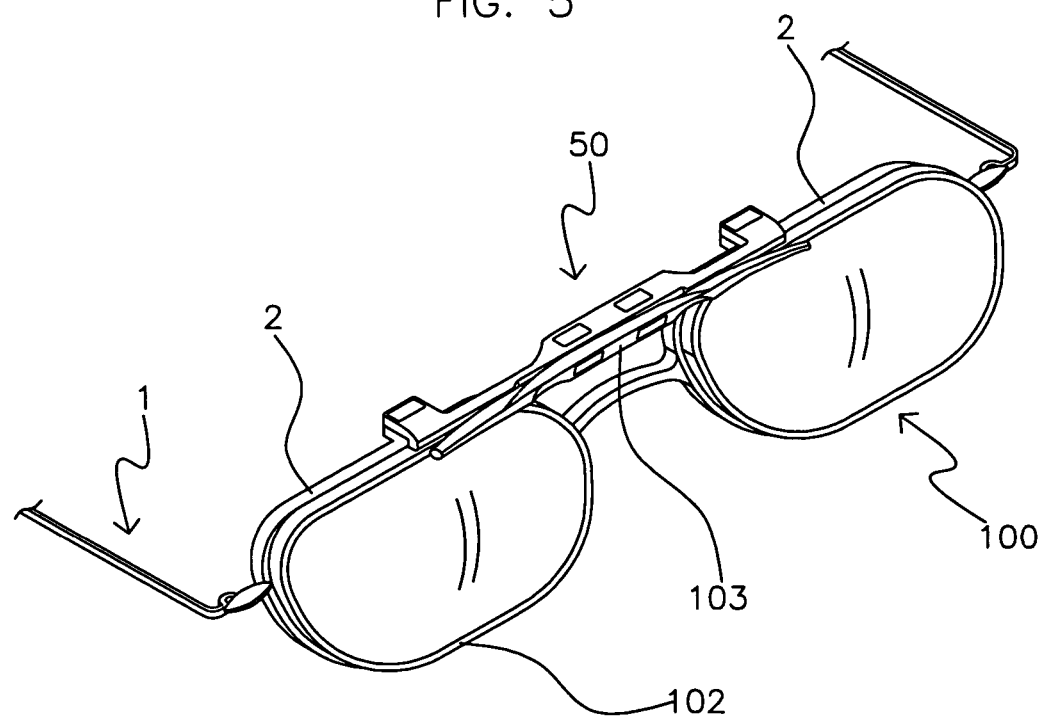
FIG. 5 is a perspective view showing a down in-use condition of the fully assembled eyeglasses assembly according to the present invention.
Figure 6:
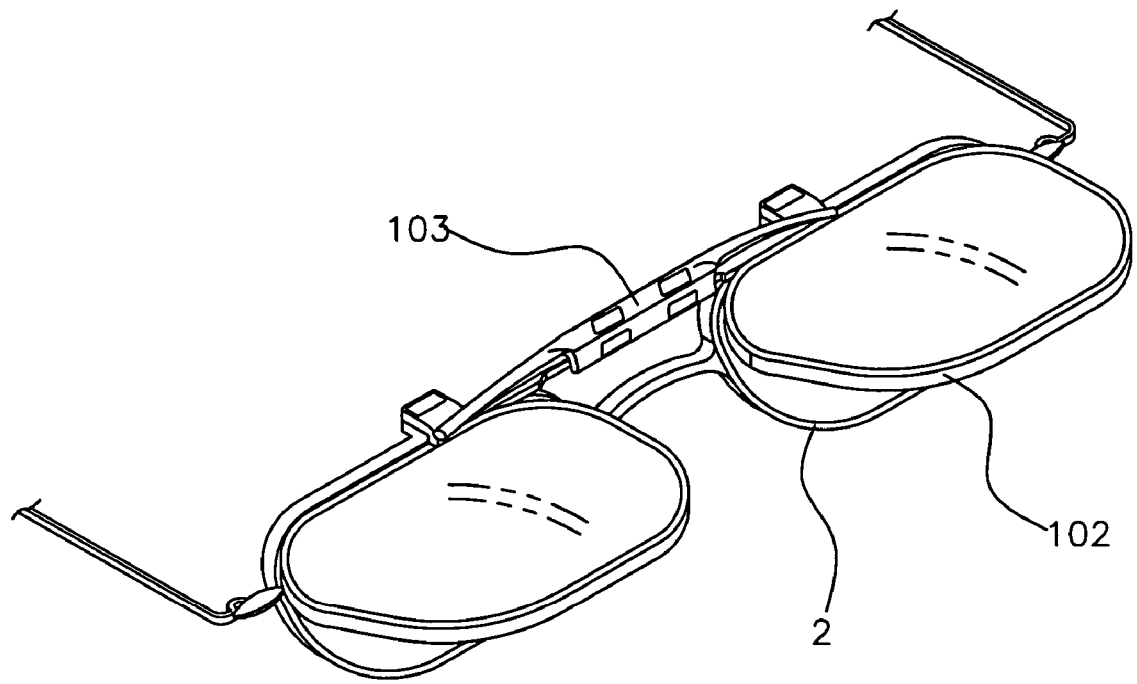
FIG. 6 is a perspective view showing a lifted-up in-use condition of the fully assembled eyeglasses assembly according to the present invention.
Figure 7:
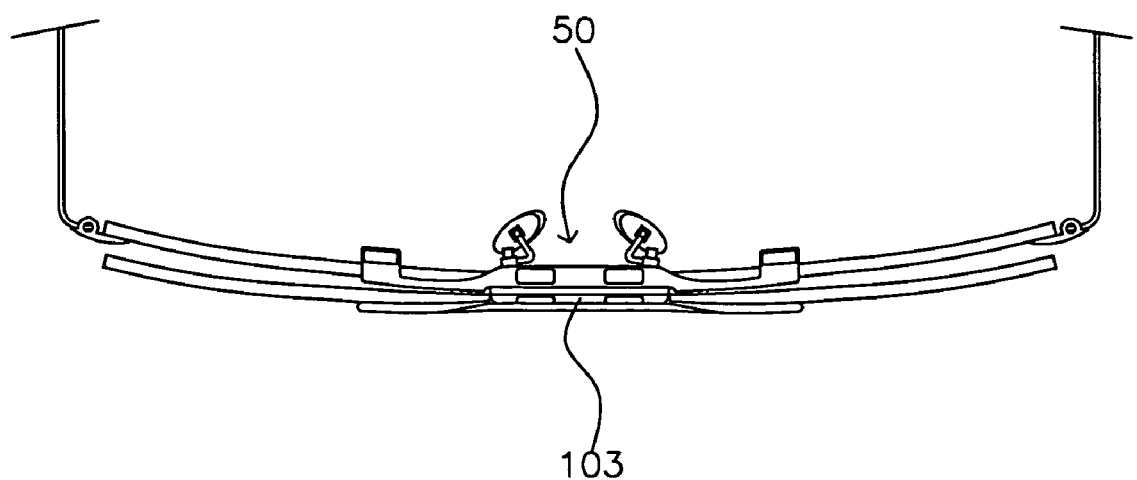
FIG. 7 is a top view of the embodiment shown in FIG. 5.
Figure 8:
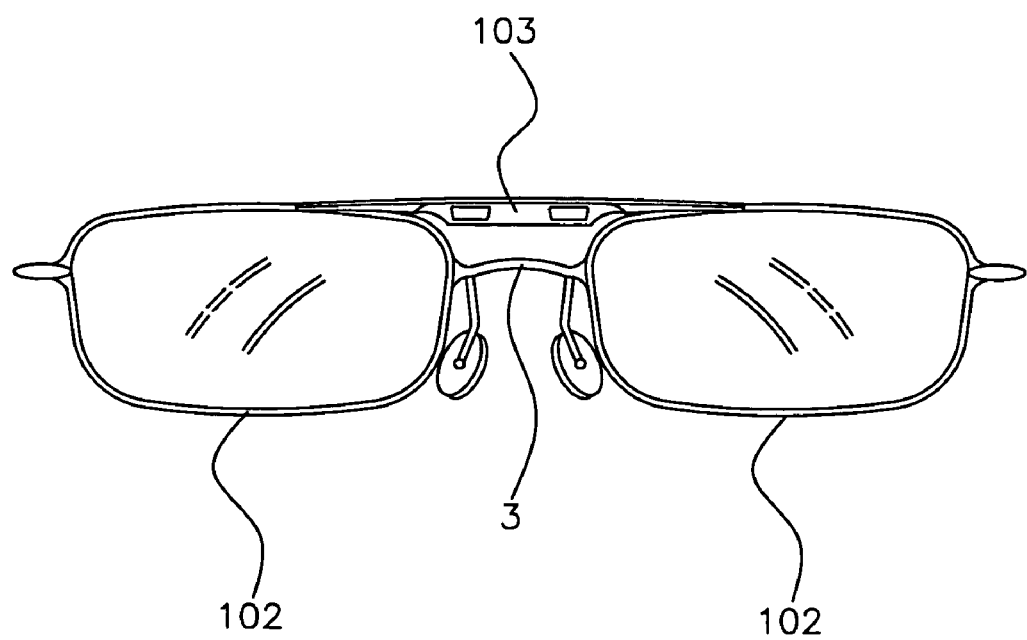
FIG. 8 is a front view of the embodiment shown in FIG. 7.

Positions of eyeglass use are shown in FIGS. 4 to 8. First, as shown in FIG. 4, the connection bar 50 is detachably mounted on the main eyeglasses 1. Next, as shown in FIG. 5, the connection bar seating portion of the nose piece 103 of the auxiliary eyeglasses 100, which has the '⌐' or '⌐' shaped section and has an opened contact surface and a closed contact surface, is closely attached to the auxiliary eyeglass seating portion 52 of the connection bar 50 by magnetic force while overlying the auxiliary eyeglass seating portion 52. After that, the opened contact surface and the closed contact surface of the nose piece, which are made of a magnetically reactive material, are selectively joined by lifting the auxiliary eyeglasses 100 up and down from the connection bar 50, so that the auxiliary eyeglasses can be kept in opened or closed states. The lifted-up in-use position of the auxiliary eyeglasses 100 is shown in FIG. 6. Top and front views of the assembled eyeglasses in the down in-use position are provided in FIGS. 7 and 8, respectively.

As set forth above, with the eyeglasses assembly according to the present invention, a user can selectively combine the auxiliary eyeglasses 100 with the main eyeglasses 2 via the connection bar 50, and when the auxiliary eyeglasses 100 are not needed, the user can wear only the main eyeglasses 1 with or without the connection bar for combining the auxiliary eyeglasses 100. Therefore, the present invention gives the user greater convenience in use as well as a fashion option conforming with the modern desirability of attaining a double bridge effect of eyeglasses by mounting only the connection bar 50 to the main eyeglasses 1.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An eyeglasses assembly comprising:
   main eyeglasses including an adjacent pair of main lens rims with main lenses, and a main nose piece for interconnecting said main lens rims;
   a connection bar mounted detachably on upper portions of the main lens rims of the main eyeglasses such that the upper portions of the main lens rims of the main eyeglasses are interconnected thereby; and
   auxiliary eyeglasses including an adjacent pair of auxiliary lens rims with auxiliary lenses, and an auxiliary nose piece for interconnecting the auxiliary lens rims, the auxiliary nose piece being mounted detachably on the connection bar such that the auxiliary eyeglasses are joined with the main eyeglasses via the connection bar,
   wherein each of the main lens rims of the main eyeglasses has a connection bar seating portion for seating the connection bar thereon; and
   wherein the connection bar includes a pair of main eyeglass seating portions mounted detachably on the main eyeglasses, and an auxiliary eyeglass seating portion on which the auxiliary eyeglasses are mounted detachably.

2. The eyeglasses assembly according to claim 1, wherein the auxiliary nose piece horizontally interconnects upper portions of the auxiliary lens rims of the auxiliary eyeglasses, and includes a connection bar seating portion formed at a center portion thereof to be detachably mounted on said auxiliary eyeglass seating portion of the connection bar.

3. The eyeglasses assembly according to claim 1, wherein magnets are used to effect the detachable mounting of said connection bar to said upper portions of the main lens rims, and said detachable mounting of said auxiliary nose piece to said connection bar.

4. An eyeglasses assembly comprising:
   main eyeglasses including an adjacent pair of main lens rims with main lenses, and a main nose piece for interconnecting said main lens rims;
   auxiliary eyeglasses including an adjacent pair of auxiliary lens rims with auxiliary lenses, and an auxiliary nose piece for interconnecting the auxiliary lens rims; and
   a separately detachable connection bar for detachably connecting said auxiliary eyeglasses to said main eyeglasses, said connection bar coupled to the main lens rims of the main eyeglasses such that upper portions of the main lens rims of the main eyeglasses are interconnected thereby,
   wherein said connection bar includes a pair of main eyeglass seating portions for detachably connecting said connection bar to said upper portions of said main eyeglasses; and
   wherein said connection bar includes an auxiliary eyeglass seating portion for detachably connecting the auxiliary eyeglasses to said connection bar.

5. The eyeglasses assembly according to claim 4, wherein said auxiliary eyeglass seating portion is formed at a center portion of said connection bar.

6. The eyeglasses assembly according to claim 5, wherein said auxiliary eyeglass seating portion includes a magnetic element.

7. The eyeglasses assembly according to claim 5, wherein the auxiliary nose piece horizontally interconnects upper portions of the auxiliary lens rims of the auxiliary eyeglasses, and includes a connection bar seating portion formed at a center portion thereof to be detachably connected to said auxiliary eyeglass seating portion of the connection bar.

8. The eyeglasses assembly according to claim 7, wherein said connection bar seating portion includes a magnetic element.

9. An eyeglasses assembly comprising:
   main eyeglasses including an adjacent pair of main lens rims with main lenses, and a main nose piece for interconnecting said main lens rims;
   a separately detachable connection element coupled to the main lens rims of the main eyeglasses such that upper portions of the main lens rims of the main eyeglasses are interconnected thereby;
   auxiliary eyeglasses including an adjacent pair of auxiliary lens rims with auxiliary lenses, and an auxiliary nose piece for interconnecting the auxiliary lens rims, the auxiliary nose piece being detachably connectable to the connection element so as to couple the auxiliary eyeglasses to the main eyeglasses using said connection element;
   said connection element including a pair of main eyeglass seating portions for detachably coupling said connection element to said upper portions of said main eyeglasses, and an auxiliary eyeglass seating portion for detachably coupling the auxiliary eyeglasses to said connection element.

10. The eyeglasses assembly according to claim 9, wherein said auxiliary eyeglass seating portion is formed at a center portion of said connection element.

11. The eyeglasses assembly according to claim 10, wherein said auxiliary eyeglass seating portion includes a magnetic element.

12. The eyeglasses assembly according to claim 10, wherein the auxiliary nose piece includes a connection element seating portion formed at a center portion thereof for detachable coupling with said auxiliary eyeglass seating portion of the connection element.

13. The eyeglasses assembly according to claim 12, wherein said connection element seating portion includes a magnetic element.

* * * * *